(12) United States Patent
Hirashita et al.

(10) Patent No.: US 6,721,906 B1
(45) Date of Patent: Apr. 13, 2004

(54) DISK APPARATUS AND CONTROL METHOD THEREFOR

(75) Inventors: Shohichi Hirashita, Chigasaki (JP); Hirofumi Saitoh, Chigasaki (JP); Kayo Takahashi, Fujisawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 419 days.

(21) Appl. No.: 09/678,208

(22) Filed: Sep. 27, 2000

(30) Foreign Application Priority Data

Sep. 28, 1999 (JP) .......................................... 11/274036

(51) Int. Cl.[7] .............................................. G06F 11/00
(52) U.S. Cl. ................................ 714/54; 714/42; 714/5
(58) Field of Search ................................ 714/54, 42, 5

(56) References Cited

U.S. PATENT DOCUMENTS

| | | | | |
|---|---|---|---|---|
| 5,696,646 A | * | 12/1997 | Satoh | 360/78.04 |
| 5,872,905 A | * | 2/1999 | Ono et al. | 714/5 |
| 5,923,876 A | * | 7/1999 | Teague | 709/321 |
| 6,289,484 B1 | * | 9/2001 | Rothberg et al. | 714/769 |
| 6,370,605 B1 | * | 4/2002 | Chong, Jr. | 710/33 |
| 6,408,406 B1 | * | 6/2002 | Parris | 714/42 |
| 6,467,054 B1 | * | 10/2002 | Lenny | 714/42 |
| 6,493,656 B1 | * | 12/2002 | Houston et al. | 714/5 |

* cited by examiner

*Primary Examiner*—Scott Baderman
*Assistant Examiner*—Anne L. Damiano
(74) *Attorney, Agent, or Firm*—Abdy Raissinia; Bracewell & Patterson, L.L.P.

(57) ABSTRACT

In a novel method for controlling a disk apparatus having an interface, command storage, and data storage, one or more commands are received from an external apparatus via the interface, and the one or more commands are held in the command storage. A command to be next executed is selected from among the one or more commands and dispatched for execution. It is determined whether an error relating to accessing the data storage has arisen during execution of the selected command. If so, the selected command is restored to the command storage. A subsequent command to be next executed may then be selected. In one described embodiment, an estimated seek time for the selected command is determined, and it is judged that an error has arisen if actual seek time of the selected command exceeds the estimated seek time.

13 Claims, 13 Drawing Sheets

DISK APPARATUS AND CONTROL METHOD THEREFOR

CROSS REFERENCE TO RELATED APPLICATIONS

Pursuant to 35 U.S.C. § 119(a), this application claims the benefit of the filing date of Japanese patent application no. 11-274,036, filed on Sep. 28, 1999.

BACKGROUND OF THE INVENTION

1. Technical Field

The present invention relates to a disk apparatus such as a hard disk drive (HDD) and a control method therefor. In particular, the present invention relates to a disk apparatus having a command queue that holds a plurality of commands transmitted from one or more external apparatuses, such as a host apparatus, in which the disk apparatus utilizes rotational position optimization (RPO) to select a command to be next executed, and to a control method for such a disk apparatus.

2. Description of the Related Art

Some disk apparatuses each comprise a command queue holding a plurality of commands. Command processing in such a disk apparatus includes queuing a command received from a host apparatus into the command queue, selecting a command to be next executed from among a plurality of execution-waiting commands in the command queue, and executing the selected command. The command to be next executed may be selected with RPO, for example.

RPO is a method of estimating seek time and latency time for each command in the command queue (where seek time is the time from starting a seek of a target track to the completion of positioning a head on the target track and latency time is disk rotation time from the completion of the head positioning to the start of accessing a target sector) and selecting the execution-waiting command having the shortest seek/latency time (i.e., seek time plus latency time) as the command to be next executed. Thus, RPO is a method for selecting, as the command to be next executed, the execution-waiting command that can access the target sector on the disk in the shortest time. To utilize RPO to select the command to be next executed is also called to "sort with RPO."

A micro program for performing the above-described command processing may include a queue handler that selects a command to be next executed from the command queue, a command handler that executes the selected command, an interface (I/F) event handler that monitors extra-drive processing (processing relating to data transfer) and that queues (stores in a queue) a command transmitted from the host apparatus, and a drive event handler that monitors intra-drive processing (processing relating to a disk access). In addition, the disk apparatus contains drive means (hardware) that drives an access mechanism and executes the intra-drive processing, and I/F means (hardware) that executes the extra-drive processing.

In addition, in conventional command s processing, if an error arises in the intra-drive processing while a command is being executed (if an error relating to a disk access arises), a retry is started and continued until an error is resolved, and a next command is executed after completing the execution of the command that generated the error. Therefore, if an error arises, the retry is performed to again access a target sector on a disk after waiting one rotation time of the disk.

FIG. 13 is a flow chart illustrating a control routine of a conventional command handler.

First, in step ST31, the command handler not only initializes the drive means and I/F means, but also transmits a parameter for command execution to the drive means and I/F means to activate the drive means and I/F means.

Next, in step ST32, the command handler judges whether an I/F event is present. If the I/F event is present in step ST32, the command handler handles the I/F event in step ST33: to go to step ST34. In addition, if the I/F event is not present in step ST32, the command handler skips step ST33 to go to step ST34.

The above-described I/F event is an event generated according to the operation of the I/F means by the I/F event handler. In addition, the I/F event processing in step ST33 is the processing of controlling the I/F means or drive means for according to the contents of the I/F event.

In step ST34, the command handler judges whether a drive event is present. If the drive event is present in step ST34, the command handler handles the drive event in step ST35 to go to step ST36. However, if the drive event is not present in step ST34, the command handler skips step ST35 to go to step ST36.

The above-described drive event is an event generated according to the operation of the drive means by the drive event handler. In addition, the drive event processing in step ST35 is the processing of controlling the drive means and/or I/F means according to the contents of the drive event.

In step ST36, the command handler judges whether the I/F event processing and drive event processing are entirely completed. If not completed, the command handler returns to the step ST32. In this manner, the command handler executes commands through a loop of steps ST32 to ST36. Then, if the intra-drive processing and extra-drive processing are entirely completed in step ST36, the command handler completes the execution of the command.

FIG. 14 illustrates a timeline for conventional command processing. FIG. 14 shows a case in which a command CMD1 is successfully executed, an error then arises in intra-drive processing (processing relating to a disk access) during the execution of a next command CMD2, and the execution of the command CMD2 is retried.

When the intra-drive processing of the command CMD1 is completed, the drive event handler 24 generates a DCOMP event (drive event) informing the command handler of the completion of the intra-drive processing, and informs the command handler of it. The command handler handles the DCOMP event (DCOMP processing), and completes the execution of the command CMD1.

During the execution of the command CMD1, a queue handler sorts commands that are stored in a command queue with RPO and selects a command CMD2 as a next command to be executed after the command CMD1. When the command handler completes the execution of the command CMD1, the queue handler transmits the command CMD2, which will be next executed, to the command handler to request the execution of the command CMD2 (KICK NEXT).

The command handler starts the execution of the command CMD2, performs the initialization as described in step ST31 shown in FIG. 13, drives the access mechanism by the drive means, and makes a seek of a target track started (KICK SEEK). Then, according to the loop of steps ST32 to ST36 that is shown in FIG. 13, the command handler advances the intra-drive processing of the command CMD2.

In addition, when the I/F means receives a new command from the host apparatus, the I/F event handler queues this command in the command queue (NEW CMD, ENQUE). The queue handler sorts a plurality of execution-waiting commands including the above-described new command with RPO (RPO SORT) and selects a command that will be executed after the command CMD2.

If an error relating to a disk access arises during the execution of the command CMD2, the drive event handler generates an error incidence event (drive event) to transmit this error incidence event to the command handler.

When the command handler recognizes the error incidence event, the command handler increments a step of an Error Recovery Procedure (ERP) to make a retry started in the drive event processing in step ST35 shown in FIG. 13. Owing to this, the access mechanism again accesses the target sector after waiting one rotation of the disk.

In a disk access, a disk apparatus not only changes a retry procedure from a first disk access procedure to a retry procedure due to an error, but also changes the retry procedure according to the number of retries, and these procedures are called ERP. In the ERP having m steps, a disk access is tried at step 0 of the ERP, and if an error arises, another disk access is tried at step 1 of the ERP. Subsequently, disk accesses are sequentially tried at steps 2 to (m-1) of the ERP, and if an error arises at step m of the ERP, the disk apparatus informs a host apparatus of a hardware error (an error relating to a disk access) arising.

If a retry completes the access without error and the intra-drive processing of the command CMD2 is completed, the drive event handler generates a DCOMP event to transmit the DCOMP event to the command handler 22. The command handler 22 handles the DCOMP event (DCOMP processing) to complete the execution of the command CMD2.

In this manner, in conventional command processing, if an error arises, the command handler starts a retry, and the disk apparatus again accesses a target sector where the error arose, after waiting one rotation of the disk.

Thus, in the above-described conventional command processing, if an error relating to a disk access arises, the disk apparatus again accesses the disk after waiting one rotation of the disk. Therefore, command execution time becomes longer by the time necessary for one rotation of the disk each time a retry is performed due to error incidence, and hence the command execution time uselessly increases every rotation time of the disk.

In addition, RPO is a method for estimating seek time and latency time when each command in the command queue is executed and for selecting a command that can access its target sector in the shortest time as the command to be next executed. However, an actual disk apparatus has a dispersion of seek times. For this reason, in conventional command processing, if seek time exceeds the time estimated with RPO, it is not possible to start the access to the target sector if the disk apparatus does not wait one rotation of the disk, and hence the time corresponding to one disk rotation is consumed.

The present invention is performed in consideration of such conventional subjects, and is to increase the efficiency of command processing by decreasing the disk latency time at the time of command execution.

SUMMARY OF THE INVENTION

In a method according to the present invention for controlling a disk apparatus having an interface, command storage, and data storage, one or more commands are received from an external apparatus via the interface, and the one or more commands are held in the command storage. A command to be next executed is selected from among the one or more commands and dispatched for execution. It is determined whether an error relating to accessing the data storage has arisen during execution of the selected command. If so, the selected command is restored to the command storage. A subsequent command to be next executed may then be selected. In one described embodiment, an estimated seek time for the selected command is determined, and it is judged that an error has arisen if actual seek time of the selected command exceeds the estimated seek time.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Embodiment 1

Figure 1:
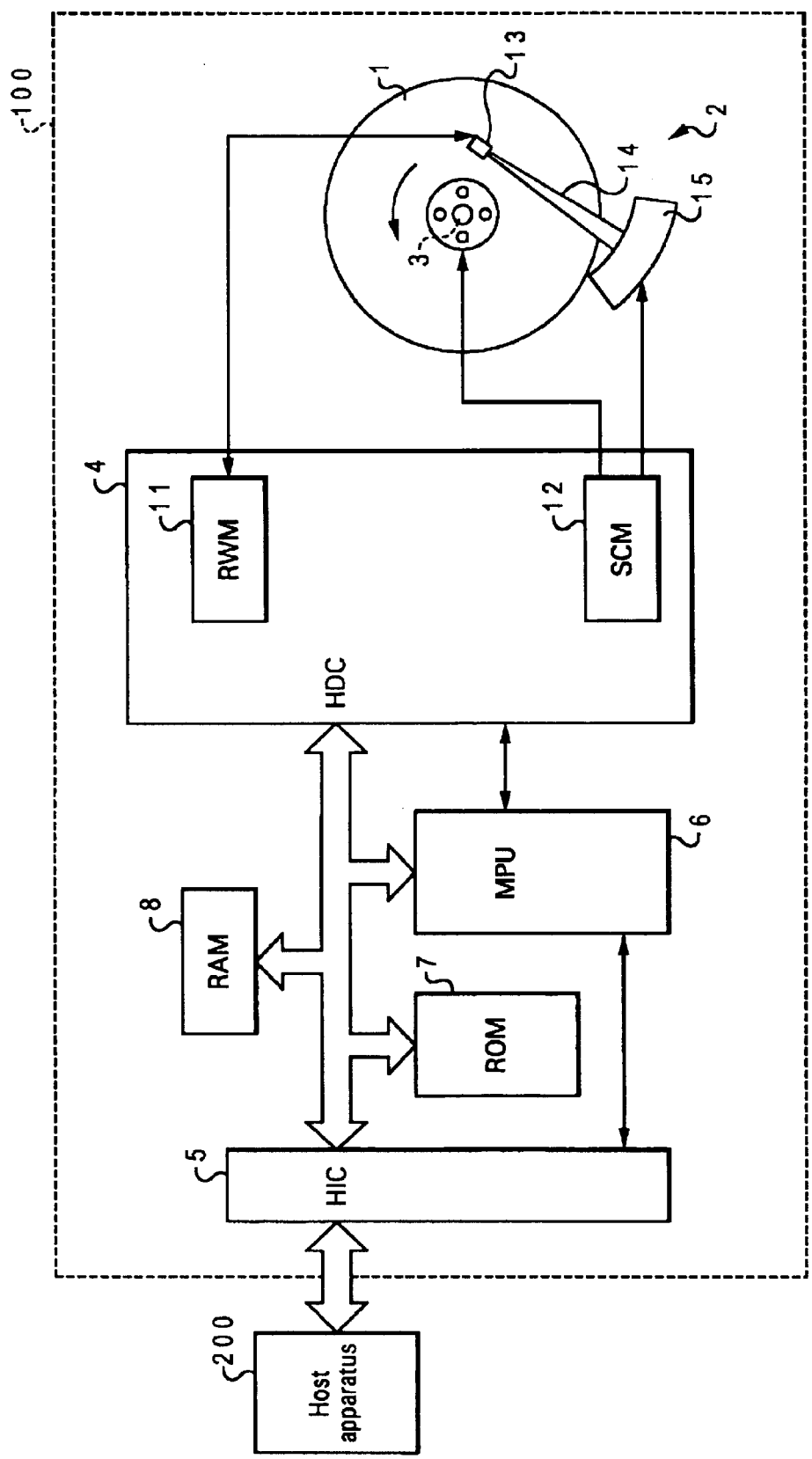
FIG. 1 is a block diagram showing an illustrative embodiment (Embodiment 1) of a disk apparatus according to the present invention.

With reference now to the figures and in particular with reference to FIG. 1, there is depicted a block diagram showing an illustrative embodiment (Embodiment 1) of a disk apparatus 100 according to the present invention. The disk apparatus 100 is an HDD of which high transmission speed is required, and comprises a disk 1 that is a data recording medium, an access mechanism 2 that rotates over and accesses the disk 1, a spindle motor 3 rotating the disk 1, a hard disk controller (HDC) 4, a host interface controller (HIC) 5 for communicating with a host apparatus 200, a micro processing unit (MPU) 6, ROM 7, and RAM 8. The HDC 4, HIC 5, MPU 6, ROM 7 and RAM 8 are connected with each other via a data bus.

A surface of the disk 1 is partitioned into plenty of tracks that are concentric circles. Each track is partitioned into plenty of sectors (data sectors). These sectors are located in the longitudinal direction (circumferential direction) of the track. In each sector, 512 bytes ($=2*16^2$ bytes) of data (user data) may be recorded, for example.

The access mechanism 2 has a read/write head 13, an arm 14 that has the read/write head 13 at the end thereof, and a voice coil motor (VCM) 15 that rotates the arm 14. This access mechanism 2 accesses the sector and writes data into the sector accessed or reads data from the sector accessed.

The HDC 4 has a read/write module (RWM) 11, and a servo control module (SCM) 12. This HDC 4 is hardware that drives the access mechanism 2 and performs the processing relating to an access (read/write of data) to the disk 1.

The RWM 11 converts write data into an analog signal at the time of data write and sends the generated write signal to the access mechanism 2. In addition, RWM 11 converts a read signal that is read from the disk 1, by the access mechanism 2 into a digital signal at the time of data read and transfers the generated read data to the RAM 8.

The SCM 12 not only drives the spindle motor 3 so that the rotational speed of the disk 1 may follow a target value, but also drives the access mechanism 2 so that the access mechanism 2 may follow a target track on the disk 1.

The HIC 5 is connected to the host apparatus 200 via a two-way data bus. This HIC 5 is hardware performing the processing relating to data transfer (reception of a read command, a write command, a read address, a write address, and write data, and transmission of read data from the disk 1) with the host apparatus 200.

The MPU 6 controls the HDC 4 and HIC 5 according to a micro program (software) stored in the ROM 7, and performs command processing in which commands transmitted from the host apparatus 200 are handled.

The micro program is stored in the ROM 7. In addition, in some cases, part of the micro program may be recorded in a special field secured beforehand on a disk surface. In this case, the part of the micro program recorded in the special field is read into the RAM 8 when the disk apparatus 100 is activated.

A command queue (storage area) for holding a plurality of commands is provided in the RAM 8, and a command transmitted from the host apparatus 200 is queued into this command queue. In addition, the RAM 8 temporarily holds (caches) the read address, write address, and write data that are received from the host apparatus 200, the read data read from the disk 1, and the like.

Figure 2:
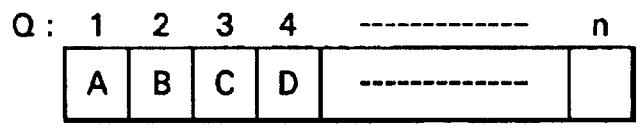
FIG. 2 is a structural drawing of an exemplary command queue in the disk apparatus of Embodiment 1.

FIG. 2 is a structural drawing of an exemplary command queue for the disk apparatus of Embodiment 1. In FIG. 2, let Q=1, 2, . . . , n be queue addresses, and let A, B, C, D, . . . be execution-waiting commands stored in the command queue. The number n is called queue depth, and, for example, the value of n may be 16. In that case, a maximum of 16 commands can be held in the command queue. A command transmitted from the host apparatus 200 is queued in the command queue shown in FIG. 2. If there is a space in the command queue, the disk apparatus 100 allows a command transmission from the host apparatus 200, and if not, the disk apparatus inhibits the command transmission until a space is made.

Commands held in the command queue are executed with RPO in the selected order. When executed, a command is deleted from the command queue. In a conventional disk apparatus, a command executed is never restored to the command queue. By contrast, in the disk apparatus 100 according to Embodiment 1, a command is restored to the command queue if an error relating to a disk access is generated while the command is being executed.

The host apparatus 200 sends a read command to the disk apparatus when requesting data read of the disk apparatus 100, and sends a first logical block address (LBA) and block length of a read object on the disk 1 thereafter. When receiving these by the HIC 5, the disk apparatus 100 not only stores the read command in the command queue, but also temporarily holds the LBA of the read object in the RAM 8. Furthermore, when the micro program executes the read command, the disk apparatus 100 controls the access mechanism 2 by the HDC 4, accesses the LBA on the disk 1, reads data recorded, and transfers this read data to the host apparatus 200 by the HIC 5.

In addition, the host apparatus 200 sends a write command to the disk apparatus when requesting data write of the disk apparatus 100, and sends a first LBA of a write object on the disk 1 and write data thereafter. When receiving these by the HIC 5, the disk apparatus 100 not only queues the write command into the command queue, but also temporarily retains the LBA of the write object and the write data in the RAM 8. Furthermore, when the micro program executes the write command, the disk apparatus 100 drives the access mechanism 2 by the HDC 4, accesses the LBA on the disk 1, and records the write data.

In addition, a disk access procedure at the time of command execution includes:

(A) a step of seeking a target track by rotating the access mechanism 2 to a position over the target track; and (B) a step of waiting when the positioning is completed until the target sector arrives under the read/write head 13 by one rotation of the disk 1, and then accessing the target sector.

The command processing by the micro program according to Embodiment 1 includes:

(A) a step of queuing a command received from the host apparatus 200 into the command queue, (B) a step of selecting a command to be next executed from among the commands in the command queue, (C) a step of executing the selected command, (D) a step of restoring the selected command to the command queue if an error relating to a disk access arises while that command is being executed, and (E) a step of selecting a command to be next executed from among a plurality of commands including the command restored.

The step (B) of Embodiment 1 is executed with queued random operation (QRO). The QRO is not a method of executing a plurality of commands from the command queue in the order of the queue, but a method of executing commands in the order of being selected according to a command selection method.

Preferably, the command selection method utilized by the disk apparatus 100 is rotational position optimization (RPO). RPO is a method of estimating seek time and latency time (where seek time is the time from starting a seek of a target track to the completion of positioning a head: over the target track, and latency time that is disk rotation time from the completion of the head positioning to the start of accessing a target sector) when executing each command in a command queue, and selecting the execution-waiting command with the shortest seek/latency time as the command to be next executed. The seek/latency time is obtained by adding the seek time to the latency time.

The command processing in Embodiment 1 is characterized in that a selected command with RPO is executed, and if an error relating to a disk access arises while the command is being executed (if an error arises in the intra-drive processing), command execution is terminated, the command is restored to the command queue, and a command to be next executed is selected with RPO from among the plurality of commands, including the command restored, in the command queue.

Here, to utilize RPO to select a command to be next executed from the plurality of commands is also called to "sort with RPO." In addition, sorting with RPO when a command that generated an error has been restored to the command queue is called "re-sorting."

Figure 3:
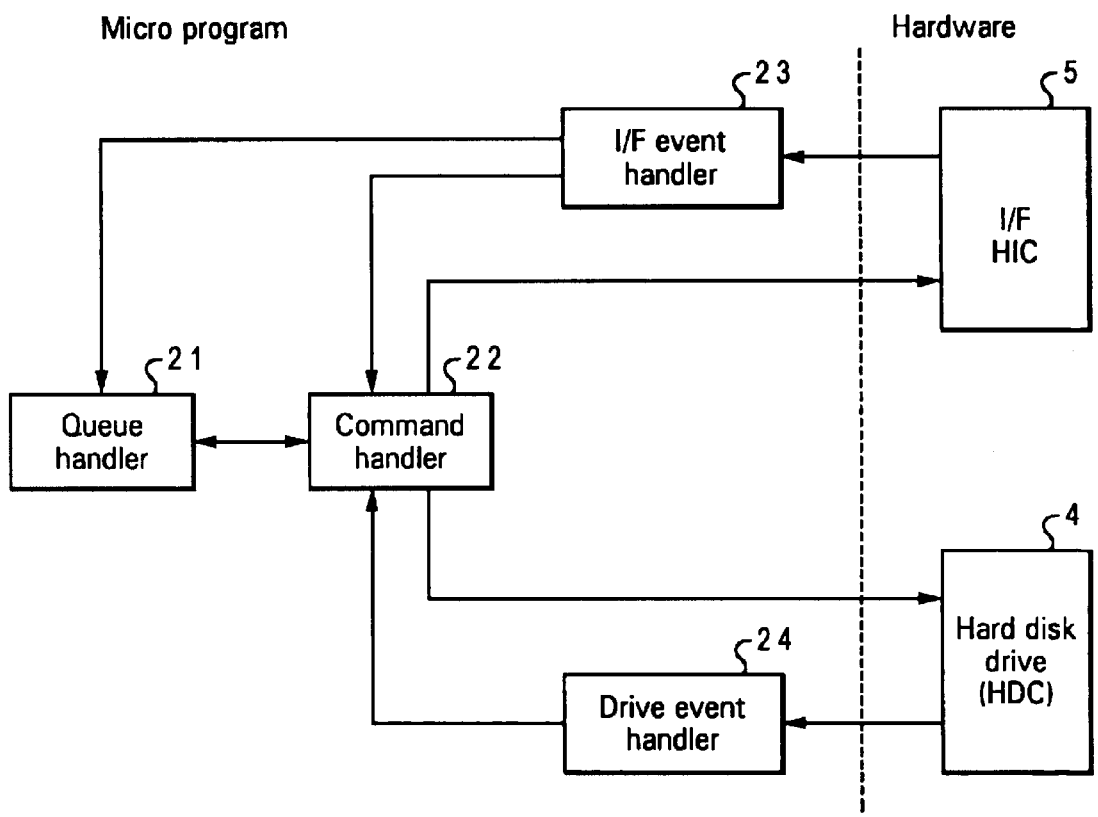
FIG. 3 is a block diagram of a micro program (software) realizing command processing in the disk apparatus according to Embodiment 1.

FIG. 3 is a block diagram of a micro program realizing the command processing in the disk apparatus according to Embodiment 1 of the present invention. In FIG. 3, the micro program controls the HDC 4 and HIC 5, which are configured with hardware, and realizes the command processing. The micro program has a queue handler 21, a command handler 22, an I/F event handler 23, and a drive event handler 24, which are control routines realizing respective functions of the micro program.

The I/F event handler 23 queues commands received from the host apparatus 200 by the HIC 5 into the command queue. In addition, the I/F event handler 23 monitors extra-drive processing (processing relating to data transfer) executed by HIC 5 under the control of the command handler 22, generates I/F events, and transmits those I/F events to the command handler 22.

The drive event handler 24 monitors intra-drive processing (processing relating to disk access) executed by HDC 4 controlled by the command handler 22, generates drive events, and transmits those drive events to the command handler 22.

The queue handler 21 sorts a plurality of commands, queued in the command queue, with RPO, and sends the command to be next executed to the command handler 22 when the command handler 22 finishes executing a current command.

The command handler 22 controls the HDC 4 and HIC 5 according to the drive events and I/F events and executes the commands sent from the queue handler 21. In addition, if an error relating to a disk access arises in the intra-drive processing during the execution of a command, the command handler 22 restores that command to the command queue.

Figure 4:
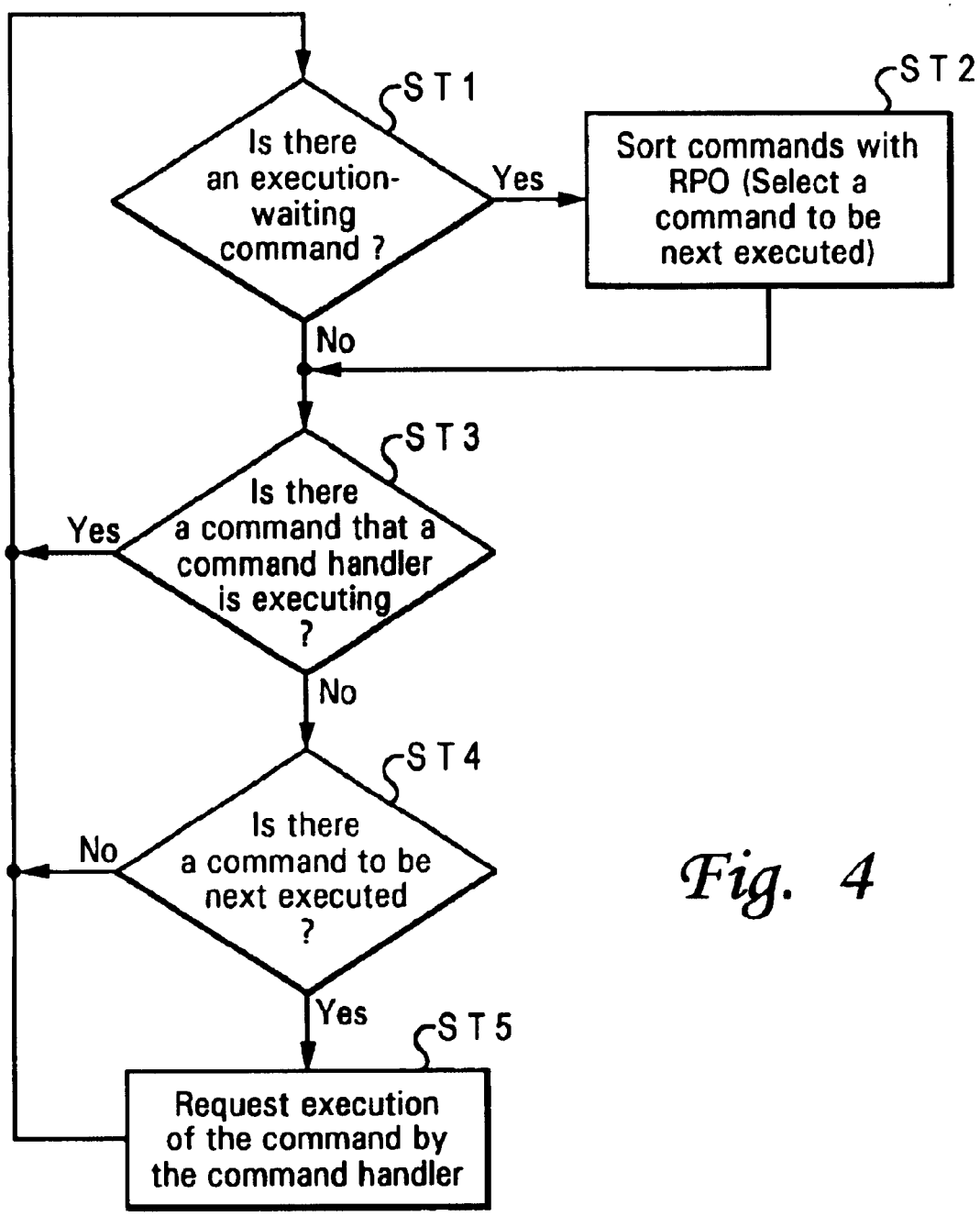
FIG. 4 is a high-level logical flow chart of a control routine of the queue handler in the micro program shown in FIG. 3.

FIG. 4 is a flow chart of the control routine of the queue handler 21. First, in step ST1, the queue handler 21 judges whether execution-waiting commands are present in the command queue. If so, the queue handler 21 sorts the commands in the command queue in step ST2 (selects a command to be next executed) to go to step ST3. If no execution-waiting commands are present, however, the process goes from step ST1 to the step ST3, bypassing step ST2.

In step ST3, the queue handler 21 judges whether the command handler 22 is currently executing a command. If so, the queue handler 21 returns to the step ST1, and if not, the queue handler 21 goes to step ST4.

In step ST4, the queue handler 21 judges whether a command to be next executed is present. If a command to be next executed is not present, the queue handler 21 returns to the step ST1. Otherwise, the queue handler 21 sends the command to be next executed to the command handler 22 in step ST5, thereby requesting the execution of the command. The process then returns to the step ST1.

Figure 5:
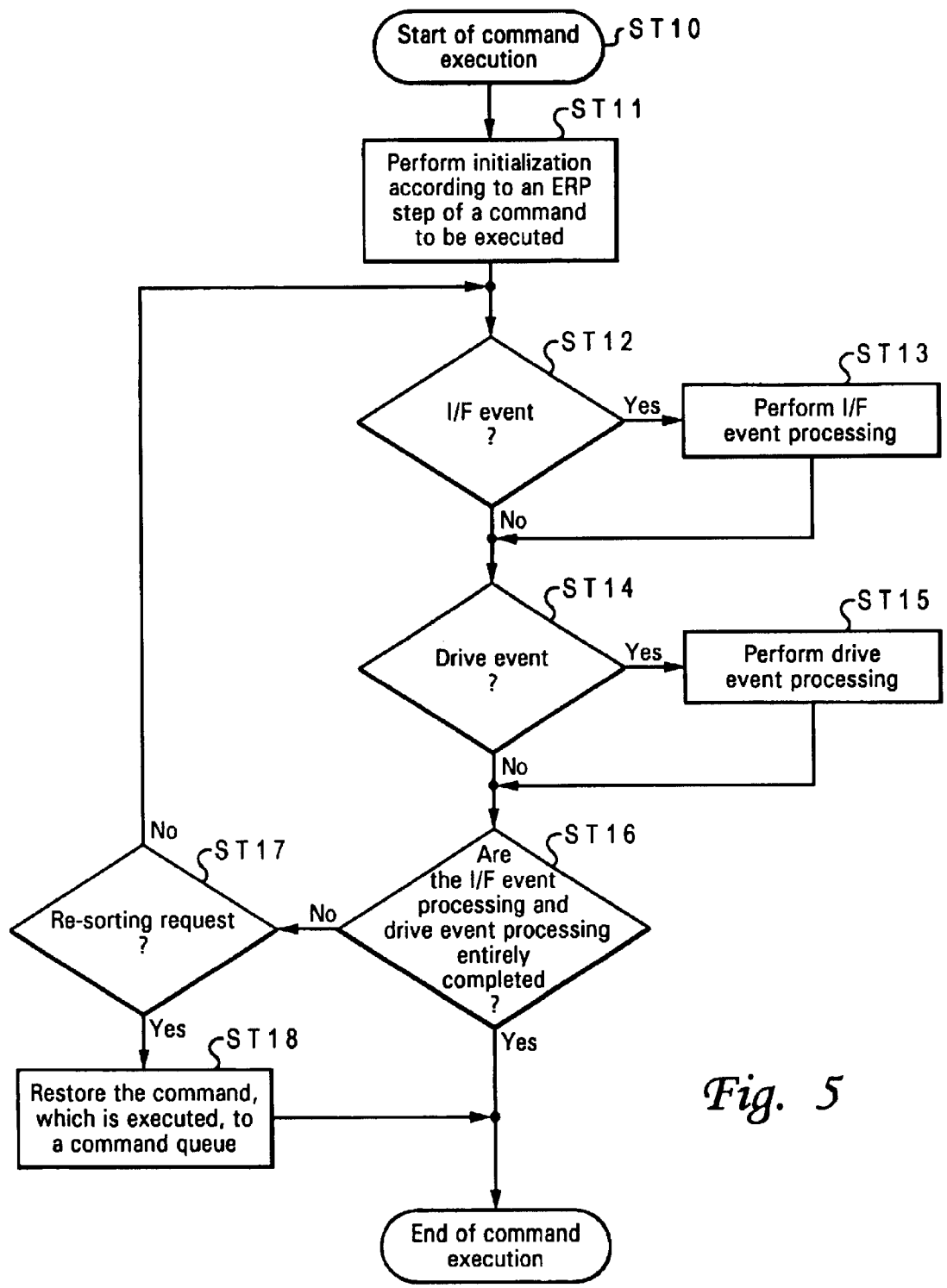
FIG. 5 is a high-level logical flow chart of a control routine of the command handler in the micro program shown in FIG. 3, according to Embodiment 1.

FIG. 5 is a flow chart explaining the control routine of the command handler 22 according to Embodiment 1. First, in step ST10, the command handler 22 receives the command to be executed from the queue handler 21. Associated with the received command is an ERP step that corresponds to the number of data access failures (if any) previously experienced by the command. Then, in step ST11, the command handler 22 performs initialization according to the ERP step of the command to be executed.

Thus, according to the ERP step of the command to be executed, the command handler 22 not only initializes the HDC 4 and HIC 5, but also sends parameters for command execution to the HDC 4 and HIC 5 to activate the HDC 4 and HIC 5 according to the ERP step of the command to be executed.

In a disk access, a conventional disk apparatus not only changes a retry procedure from a first disk access procedure to a retry procedure in response to an error, but also changes the retry procedure according to the number of retries. These procedures are called ERP. In an ERP having m steps, a disk access is tried at step 0 of the ERP, and if an error arises, another disk access is tried at step 1 of the ERP. Subsequently, disk accesses are sequentially tried at steps 2 to (m-1) of the ERP. If an error arises at step m of the ERP, the disk apparatus informs a host apparatus that a hardware error (an error relating to a disk access) has arisen.

When restoring a command to the command queue due to a disk access error, the disk apparatus 100 according to Embodiment 1 increments an ERP step of the command. Owing to this, the disk apparatus 100 first executes a command at ERP step 0, and (after the command is restored to the command queue due to the first error and eventually re-selected by the queue handler 21) executes the same command at ERP step 1. Subsequently, the disk apparatus 100 sequentially executes the same command at ERP steps 2 to (m-1) for every error and executes the same command at ERP step m. If an error arises after the mth error, the disk apparatus 100 informs the host apparatus 200 of a hard error without restoring the command to the command queue. Since an ERP step varies in the disk apparatus 100 in this manner depending on how many times a command is restored to the command queue, it is necessary to perform the initialization according to the ERP step.

Next, after the command handler 22 has initialized the HDC 4 and HIC 5, in step ST12 the command handler 22 judges whether an I/F event is present. If so, the command handler 22 handles the I/F event in step ST13 to go to step ST14. However, if an I/F event is not present, the command handler 22 skips step ST13 to go to the step ST14.

The I/F event is an event generated according to the operation of the HIC 5 by the I/F event handler 23 monitoring the HIC 5. In addition, the I/F event processing in step ST13 is the processing of controlling the HIC 5 and/or HDC 4 according to the contents of the I/F event.

In step ST14, the command handler 22 judges whether a drive event is present. If so, the command handler 22 handles the drive event in step ST15 to go to step ST16. If a drive event is not present, however, the command handler 22 skips step ST15 to go to the step ST16.

The above-described drive event is an event generated according to the operation of the HDC 4 by the drive event handler 24 monitoring the HDC 4. In addition, the I/F event processing in step ST15 is the processing of controlling the HDC 4 and/or HIC 5 according to the contents of the drive event.

In step ST16, the command handler 22 judges whether the extra-drive processing (processing relating to data transfer by the HIC 5) and intra-drive processing (processing relating to a disk access by the HDC 4) are entirely completed. If extra-drive processing and intra-drive processing are not completed, the command handler 22 goes to step ST17, judges whether a re-sorting request is present, and returns to the step ST12 if not present. In this manner, the command handler 22 executes a command with a loop of the steps ST12 to ST17. If it is determined in step ST16 that the extra-drive processing and intra-drive processing are entirely completed, the command handler 22 completes the command execution.

If an error relating to a disk access arises during command execution, the drive event handler 24 generates a drive event announcing the incidence of the error. When recognizing the drive event of the error incidence in step ST14, the command handler 22 executes error processing in the drive event processing in step ST15.

Figure 6:
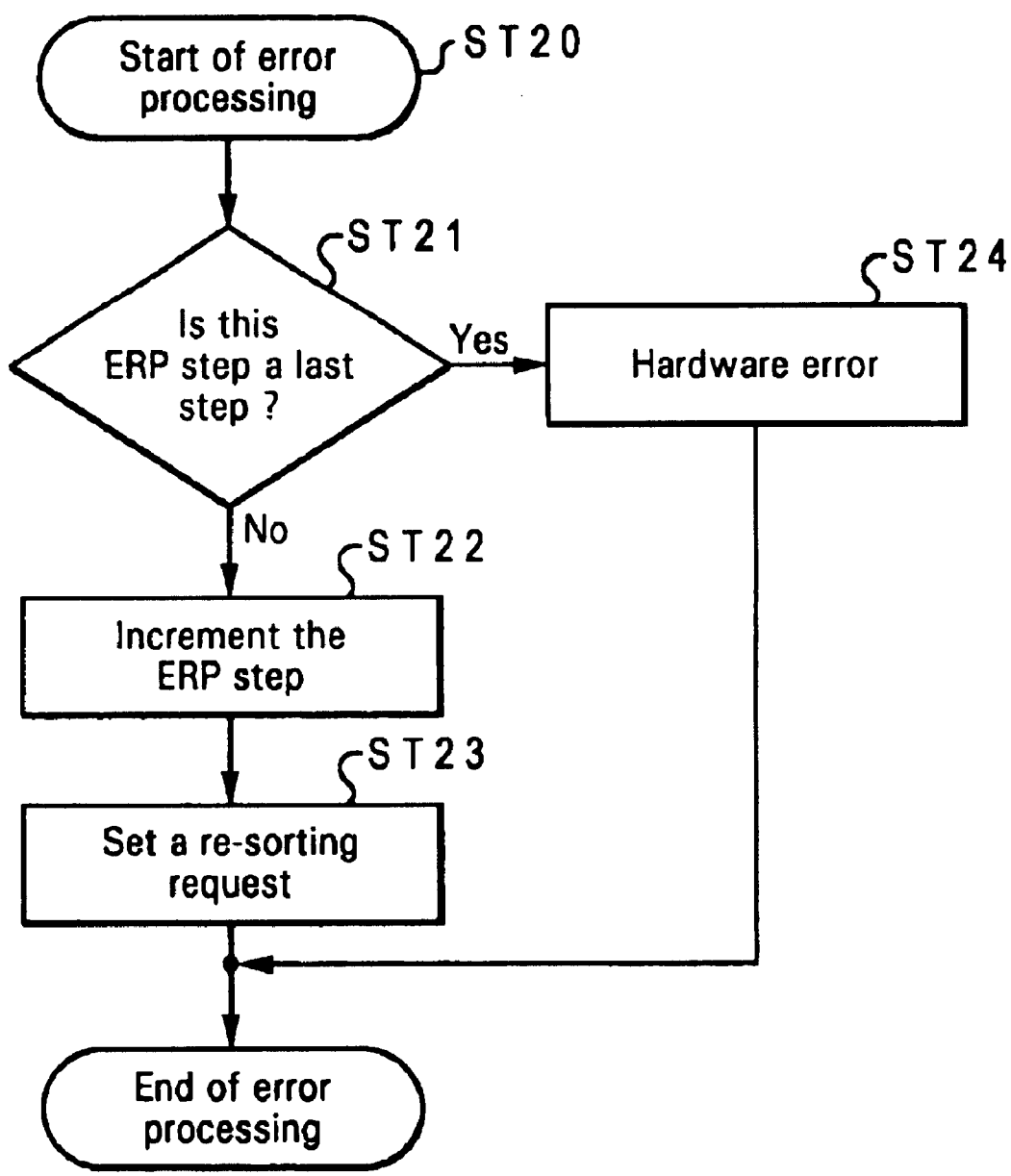
FIG. 6 is a high-level logical flow chart of error processing in the intra-drive processing by the micro program shown in FIG. 3.

FIG. 6 is a flow chart explaining the error processing in the command handler 22. The process starts in step ST20 with command handler 22 receiving a drive event and recognizing that event as indicative of an error relating to disk access. The command handler 22 then judges in step ST21 whether the current ERP step of the command generating the error is the last step (step m)

If the current ERP step is not the last step, the command handler 22 increments the ERP step of the command in step ST22 and sets a re-sorting request in step ST23 to complete the error processing.

However, if the ERP step is the last step, the command handler 22 executes the processing for informing the host apparatus 200 of the incidence of a hardware error in step ST24 to complete the error processing.

Returning to FIG. 5, if the re-sorting request is set in the error processing in the drive event processing executed in step ST15, the command handler 22 judges in step ST17 that a re-sorting request is present and consequently goes to step ST18. Then, the command handler 22 restores the command that is being executed to the command queue in step ST18 to complete (terminate) the execution of the command.

Figure 7:
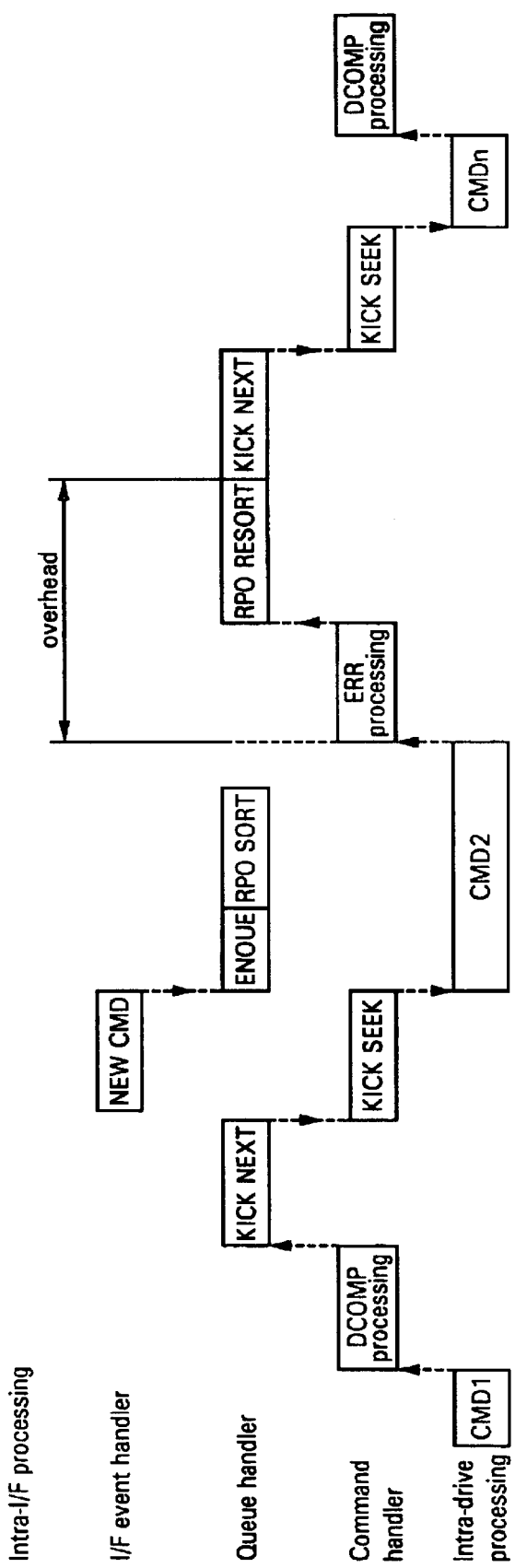
FIG. 7 illustrates a timeline for command processing according to Embodiment 1.

FIG. 7 illustrates an exemplary timeline for command processing according to Embodiment 1 of the present invention. FIG. 7 shows the command processing in such a case that a command CMD1 was successfully executed, an error arises in intra-drive processing (processing relating to a disk access) during the execution of a next command CMD2, and the error processing is performed.

When the intra-drive processing of the command CMD1 is completed, the drive event handler 24 generates a DCOMP event (drive event) indicating that intra-drive processing is completed, and transmits the DCOMP event to the command handler 22. The command handler 22 handles the DCOMP event (DCOMP processing) and completes the execution of the command CMD1. In addition, the command handler 22 executes extra-drive processing such as notification of the completion of command execution and transmission of read data in the DCOMP processing (drive event processing).

A queue handler 21 sorts commands queued in the command queue during the execution of the command CMD1 with RPO and selects the command CMD2 as a next command to be executed after the command CMD1. When the command handler 22 completes the execution of the command CMD1, the queue handler sends the command CMD2, which will be next executed, to the command handler 22 to request the execution of the command CMD2 (KICK NEXT).

The command handler 22 starts the execution of the command CMD2, performs the initialization according to the command CMD2 to be executed, as described in step ST11 shown in FIG. 5, drives the access mechanism 2 by the HDC 4, and makes a seek of a target track started (KICK SEEK). Then, according to the loop of steps ST12 to ST17 that is shown in FIG. 5, the command handler 22 advances the intra-drive processing of the command CMD2.

In addition, when the host apparatus 200 transmits a new command to the disk apparatus 100 and the HIC 5 receives the new command, the I/F event handler 23 queues this command into the command queue (NEW CMD, ENQUE). The queue handler 21 sorts a plurality of execution-waiting commands including the above-described new command with RPO (RPO SORT), and selects a command that will be executed after the command CMD2.

If an error relating to a disk access arises during the execution of the command CMD2, the drive event handler 24 generates an error incidence event (drive event) to transmit this error incidence event to the command handler 22.

When recognizing the error incidence event, the command handler 22 executes error processing (ERR processing) according to the procedure in FIG. 6 to restore the command CMD2 to the command queue (assuming that the ERP step of the command CMD2 is not the last step).

The queue handler 21 re-sorts a plurality of execution-waiting commands, including the command CMD2 restored, with RPO (RPO RE-SORT), selects a command CMDn as a command to be next executed, and sends this command CMDn to the command handler 22 to request the execution of the command CMDn (KICK NEXT).

The command handler 22 starts the execution of the command CMDn, performs initialization according to the command CMDn, makes a seek of the target track started (KICK SEEK), and advances the intra-drive processing of the command CMDn. Then, when the intra-drive processing of the command CMDn is completed, the drive event handler 24 generates a DCOMP event to transmit the DCOM event to the command handler 22. The command handler 22 handles the DCOMP event (DCOMP processing) to complete the execution of the command CMDn.

In the command processing in this embodiment, if an error relating to a disk access arises during command execution, the error processing shown in FIG. 6 is executed, a command being executed is restored to the command queue, a plurality of execution-waiting commands (including the command restored) is re-sorted with RPO, and a command selected by re-sorting is executed. For this reason, the overhead due to the error incidence is the time elapsing from the start of the error processing to the start of the execution of a selected command by the re-sorting (see the overhead in FIG. 7). Therefore, the above-described overhead is (a time necessary for error processing)+(re-sorting time); for example, 0.5–1 ms.

In conventional command processing, if an error arises during command execution (during the execution of ERP step 0), a disk apparatus soon starts a retry (ERP step 1), and again accesses a target track after waiting one rotation of the disk 1. On the other hand, in the command processing according to Embodiment 1, if an error arises during command execution (during the execution of ERP step 0), the disk apparatus 100 starts the execution of a command after waiting the above-described overhead time, starts the re-execution of the command generating an error (ERP step 1) after executing several other commands, and again accesses a target sector after waiting the seek/latency time. Furthermore, in the retry in conventional command processing, the seek/latency time is included in latency time of one disk rotation.

Even if the above-described seek/latency time is equal to the command re-execution time, (overhead time)+(command re-execution time) is shorter than the latency time of one disk rotation. Therefore, in the command processing in Embodiment 1, it is possible to shorten the command execution time when an error arises from that of conventional disk apparatus. The amount of time saved for every error is (latency time of one disk rotation)−{(overhead time)+(command re-execution time)}.

Figure 8:
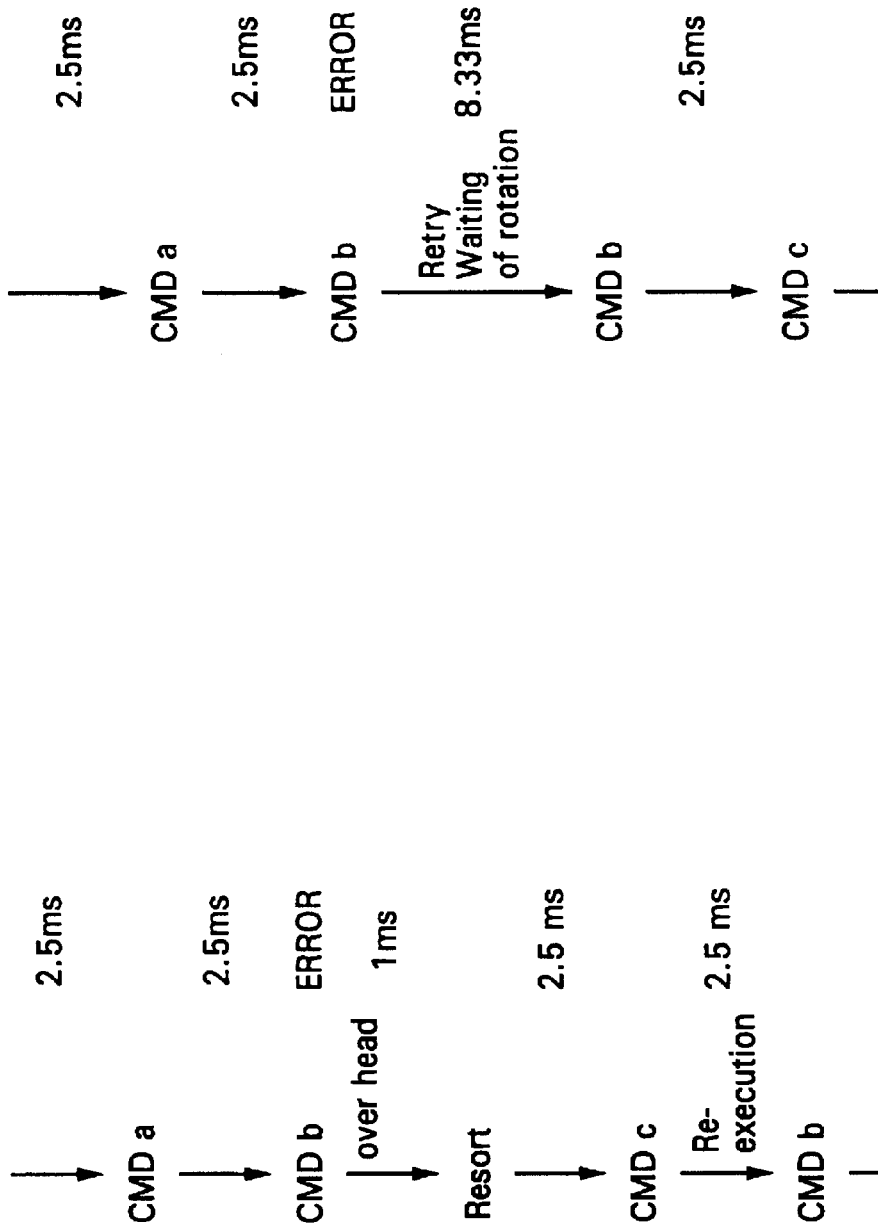
FIGS. 8A and 8B are diagrams highlighting the differences between the command processing of Embodiment 1 of the present invention and conventional command processing.

FIGS. 8A and 8B are diagrams highlighting the differences between the command processing of Embodiment 1 of the present invention and conventional command processing. FIG. 8A shows the command processing according to Embodiment 1, and FIG. 8B shows conventional command processing. FIG. 8A shows the command processing in a disk apparatus having specifications such as 7200 rpm of disk rotational speed, and 400 IOPs (Input/Output Per second; equal to 400 command/s) of performance. The IOPs is the number of commands executed every second. If 400 commands are executed every second, the performance is expressed as IOPs=400 [commands/s] or simply 400 IOPs. Therefore, the disk apparatus having 400 IOPs of performance is a disk apparatus where 400 commands are executed every second. In the above-described disk apparatus, a time elapsing for one disk rotation is 8.33 ms, and one command execution time is 2.5 ms in case of normal termination.

In the conventional command processing shown in FIG. 8B, the disk apparatus starts the execution of a command CMDb after the completion of the execution of a command CMDa. If an error relating to a disk access arises while the command CMDb is executing, the disk apparatus starts a retry, and again accesses a target sector after waiting 8.33 ms, when the disk rotates by one turn, from the error incidence. Owing to this second access, the error is resolved, and hence the disk apparatus starts the execution of a command CMDc after the completion of the execution of the command CMDb. Therefore, in the conventional command processing, the time necessary for executing the commands CMDa, CMDb, and CMDc is 2.5+(2.5+8.33)+2.5=15.83 ms.

On the other hand, in the command processing according to Embodiment 1 that is shown in FIG. 8A, the disk apparatus starts the execution of the command CMDb after the completion of the execution of the command CMDa. If an error relating to a disk access arises while the command CMDb is executing, the disk apparatus soon performs the error processing shown in FIG. 6, restores the command CMDb to the command queue, re-sorts a plurality of execution-waiting commands including the command CMDb restored, and starts the execution of the command CMDc selected as a command to be next executed. The disk apparatus again selects the command CMDb as a command to be executed after the command CMDc, and starts the re-execution of the command CMDb when the execution of the command CMDc is completed. Therefore, in the command processing according to Embodiment 1, the time necessary for executing the commands CMDa, CMDb, and CMDc is 2.5+(1+2.5)+2.5+2.5=11 ms if it is assumed that the overhead is 1 ms, and hence it is possible to shorten the execution time by 4 ms or more from that of the conventional disk apparatus.

Figure 9:
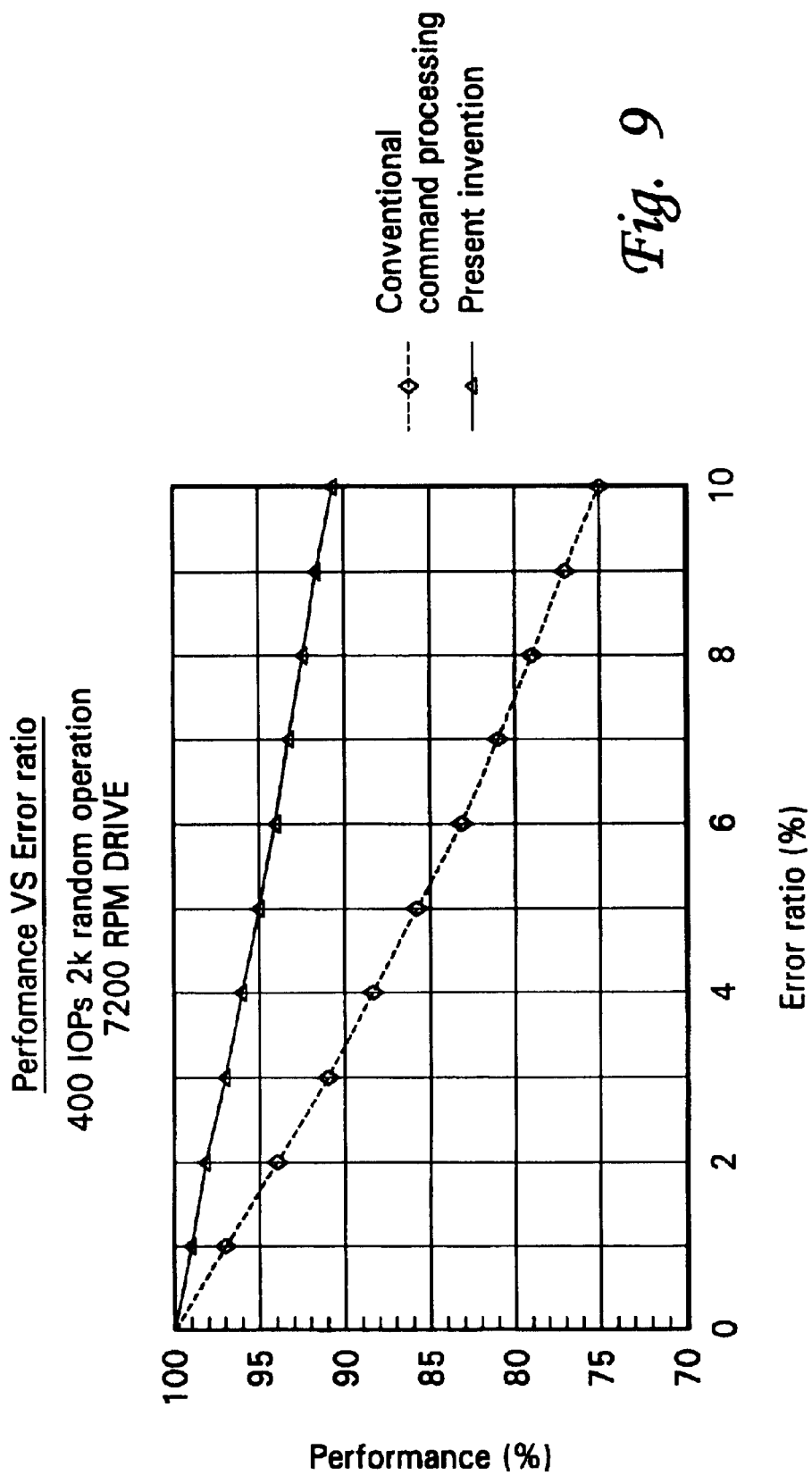
FIG. 9 is a graph showing the relationship between an error incidence ratio and a performance degradation ratio in regard to conventional command processing and the command processing of the present invention.
Figure 10:
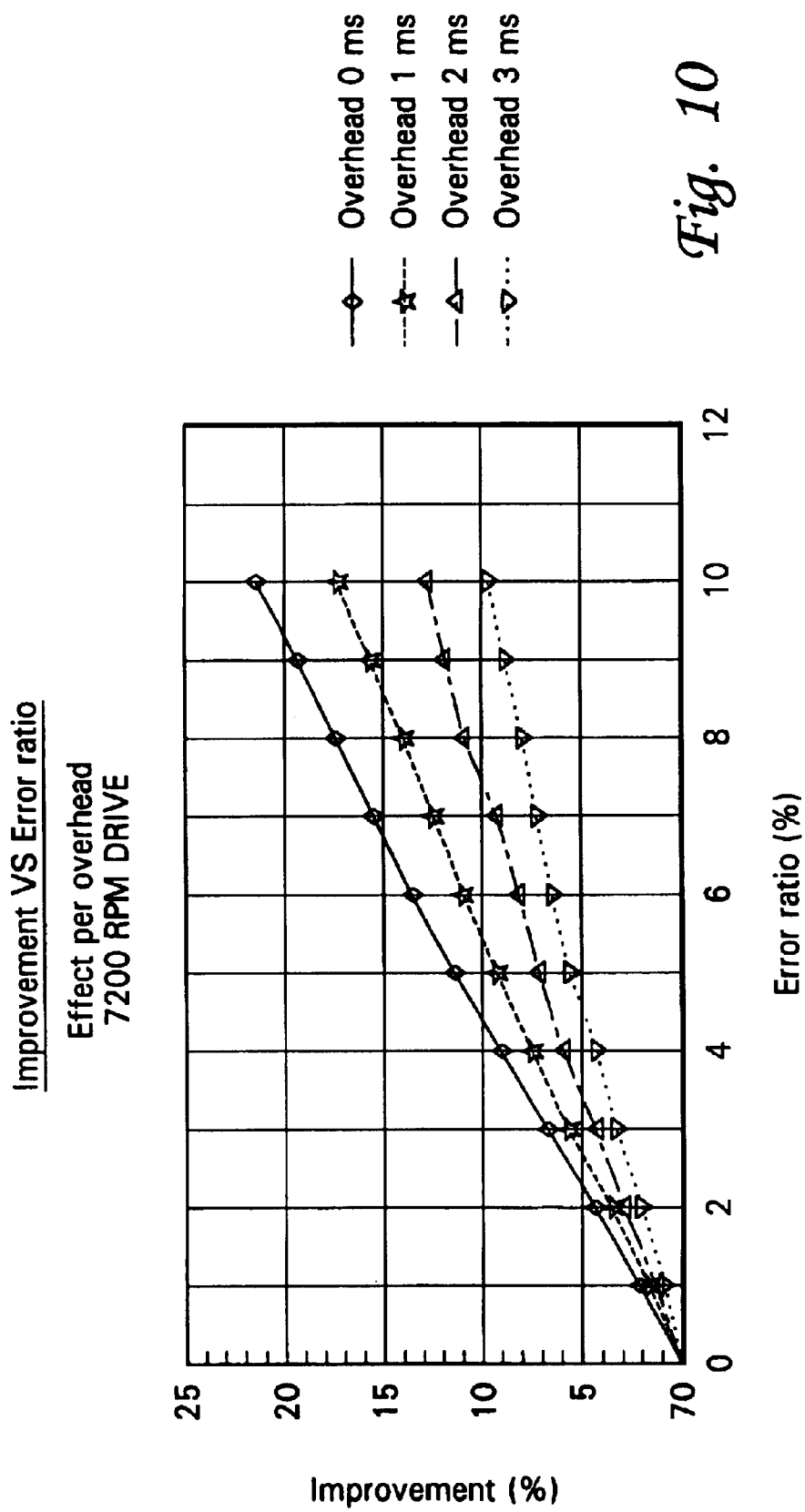
FIG. 10 is a graph showing the performance improvement associated with various overhead times and error incidence ratios with commands processed according to the present invention.
Figure 11:
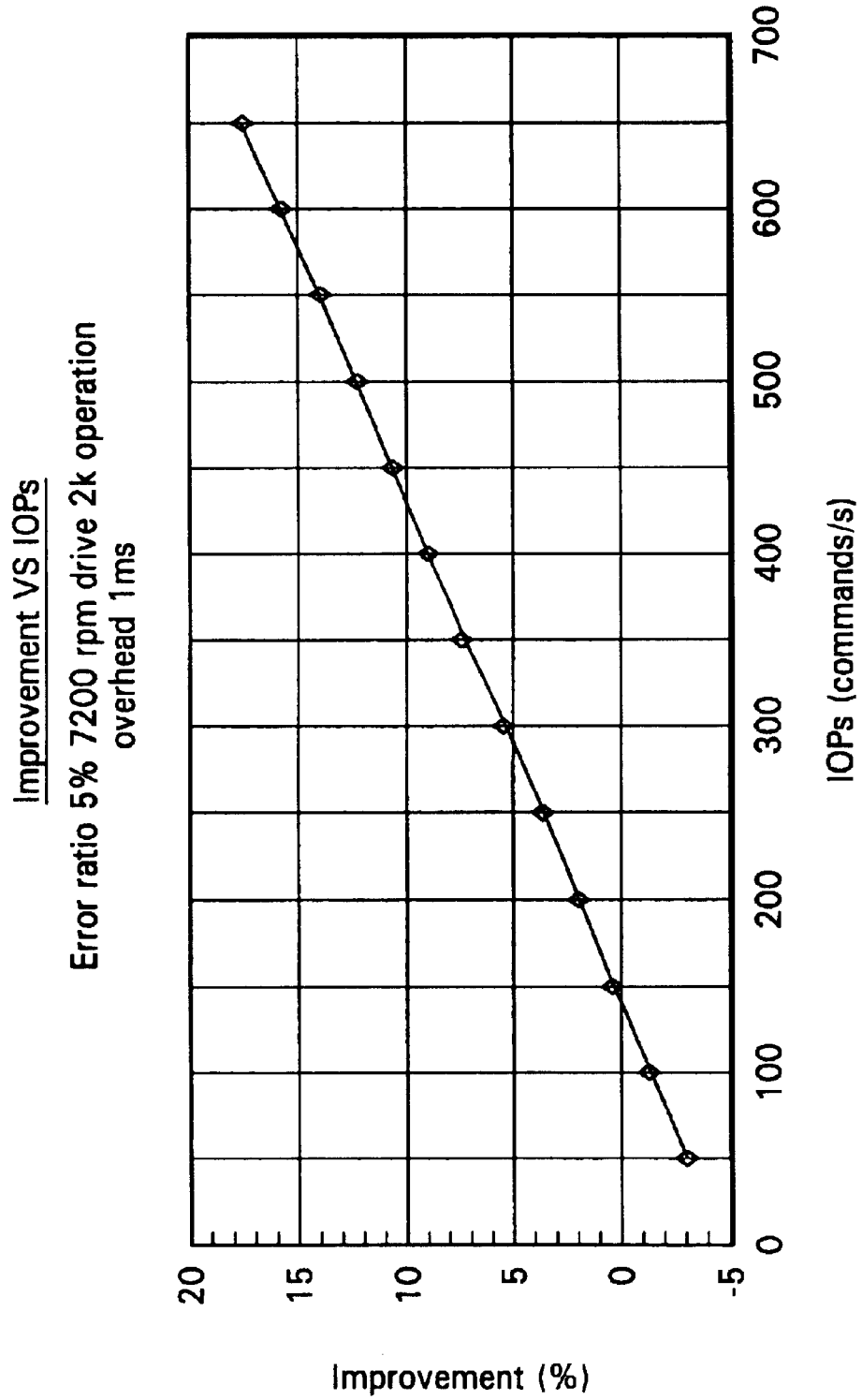
FIG. 11 is a graph showing the relationship between inputs/outputs per second (IOPs) and the performance improvement ratio by the command processing of the present invention.

FIGS. 9, 10, and 11 are graphs comparing the effects of command processing according to Embodiment 1 of the present invention with the effects of conventional command processing. These graphs show the effects of 2k random operation in a disk apparatus having specifications such as the provision of a command queue with a queue depth of 16 and disk rotational speed of 7200 rpm. Here, "2k random operation" is to send a plurality of commands reading/writing data having LBA length of 4 (sector length: 4; data length: 2 KB) to the disk apparatus having a disk area of LBAs=0 to 204800 (100 Mbytes). The plurality of commands sent to the disk apparatus each randomly access the disk area, and each is sent lest a space should be left in the command queue. In addition, the error ratio is 1 error per command or less.

FIG. 9 is a graph showing the relationship between an error incidence ratio (Error ratio) and a performance degradation ratio (Performance) in regard to conventional command processing and the command processing of the present invention. In FIG. 9, it is assumed that the overhead is 0 sec, and that a disk apparatus has 400 IOPs of performance. The above-described error incidence ratio is a ratio between the number of commands each generating an error and the number of total commands executed, and its unit is %. In addition, the above-described performance degradation ratio is a ratio between the number of commands, which are executed every second at each error ratio, and the number of commands (=400) that would be executed every second if no errors arose, and its unit is %.

In FIG. 9, it can be seen that the command processing according to the present invention can make the performance degradation due to the error incidence lower than conventional command processing. In addition, it can also be seen that the higher the error ratio becomes, the larger a suppression effect of the performance degradation according to the present invention becomes.

FIG. 10 is a graph showing the performance improvement ratios (Improvement) associated with various overhead times and error incidence ratios (Error ratio) with commands processed according to the present invention. In particular, FIG. 10 shows cases of overhead=0, 1, 2, and 3 ms, in a disk apparatus with 400 IOPs of performance. The performance improvement ratio is a ratio between an additional number (which is the difference between the number of commands executed every second utilizing command processing according to the present invention and the number of commands executed every second by conventional command processing, at each error incidence ratio) and the number of commands (=400) executed every second without an error arising.

Its unit is %. In FIG. 10, it can be seen that, even if the overhead due to the error incidence is 3 ms, the command processing according to the present invention has an effect of performance improvement over conventional command processing.

In addition, FIG. 11 is a graph showing the relationship between IOPs and the performance improvement ratio by the command processing of the present invention when the error incidence ratio is 5%. In FIG. 11, it can be seen that the larger the IOPs becomes, the larger the effect of performance improvement by the command processing according to the present invention becomes. The performance of a current disk apparatus is, for example, IOPs=400 commands per second, and it is estimated that acceleration will be promoted in future disk apparatuses, and hence IOPs will exceed 400 commands per second. FIG. 11 backs up the importance of the command processing according to the present invention (command processing where a command generating an error is restored to a command queue and re-sorting is performed).

In this manner, according to Embodiment 1, if an error relating to a disk access arises during command execution, a disk apparatus restores a command that is being executed to a command queue, selects a command to be next executed from among a plurality of commands (including the command restored) in the command queue with RPO, and executes the selected command. Owing to this, it is possible to increase the efficiency of command processing by reducing a rotational latency time of a disk at the time of the command execution.

Embodiment 2

A disk apparatus according to Embodiment 2 of the present invention is configured so that the disk apparatus according to Embodiment 1 judges that an error arises if seek time in intra-drive processing (processing relating to a disk access) exceeds seek time estimated with RPO. Here, a seek time in the intra-drive processing that exceeds the seek time estimated with RPO is called long seek time.

Figure 12:
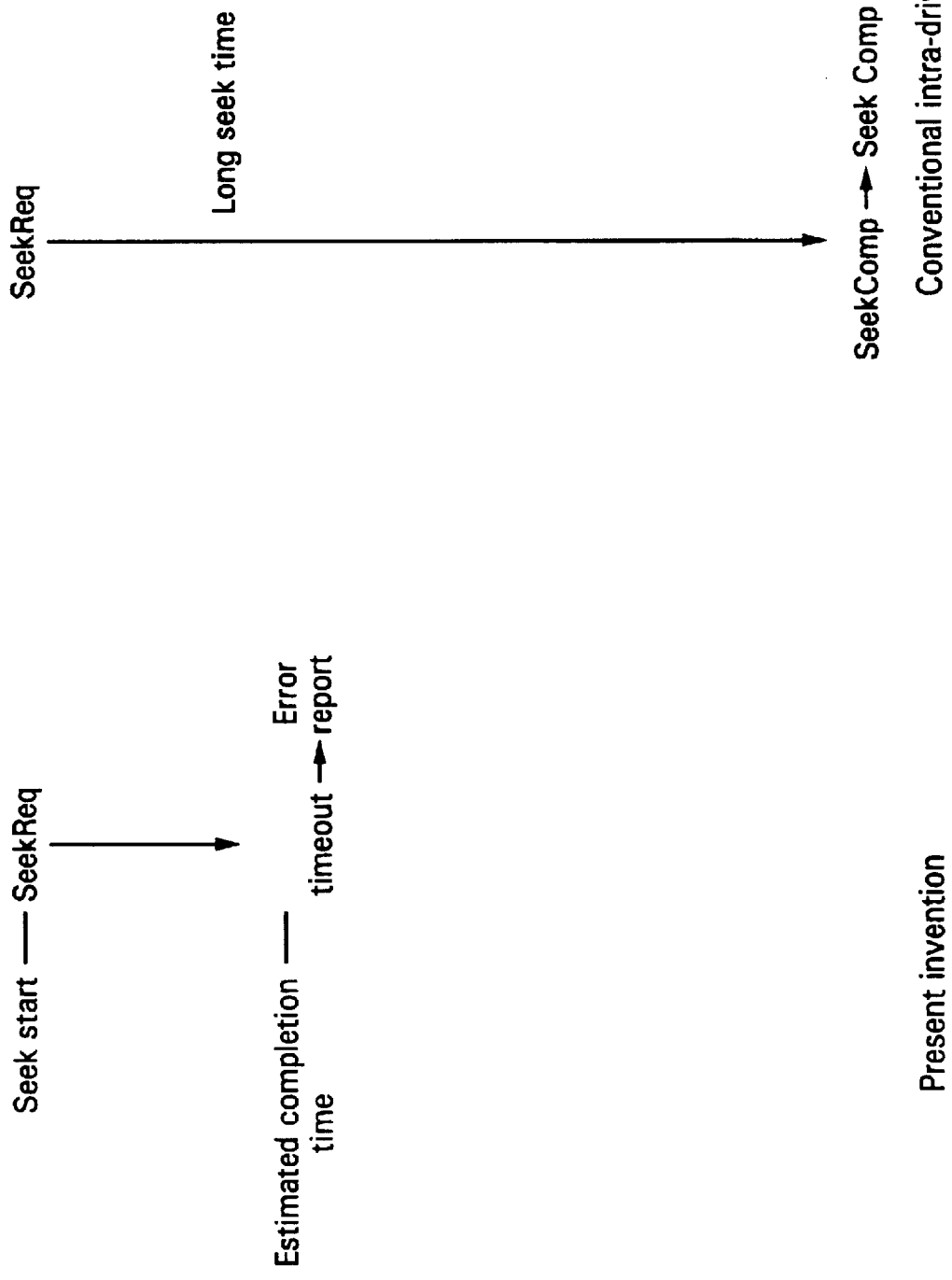
FIGS. 12A and 12B are diagrams that highlight the differences between the intra-drive processing of Embodiment 2 of the present invention and conventional intra-drive processing when dealing with long seek times.
Figure 13:
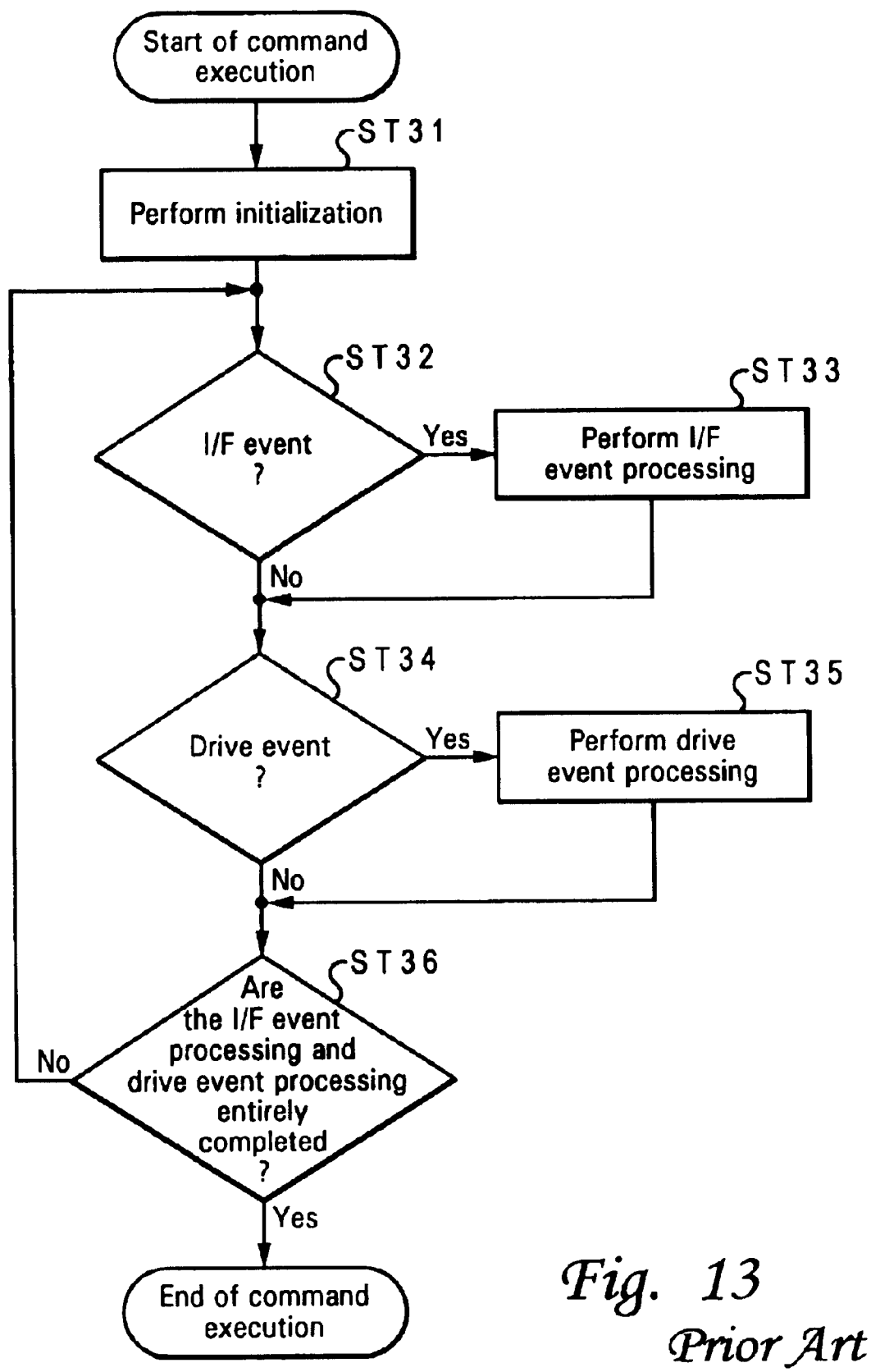
FIG. 13 is a high-level logical flow chart of a control routine of a conventional command handler.
Figure 14:
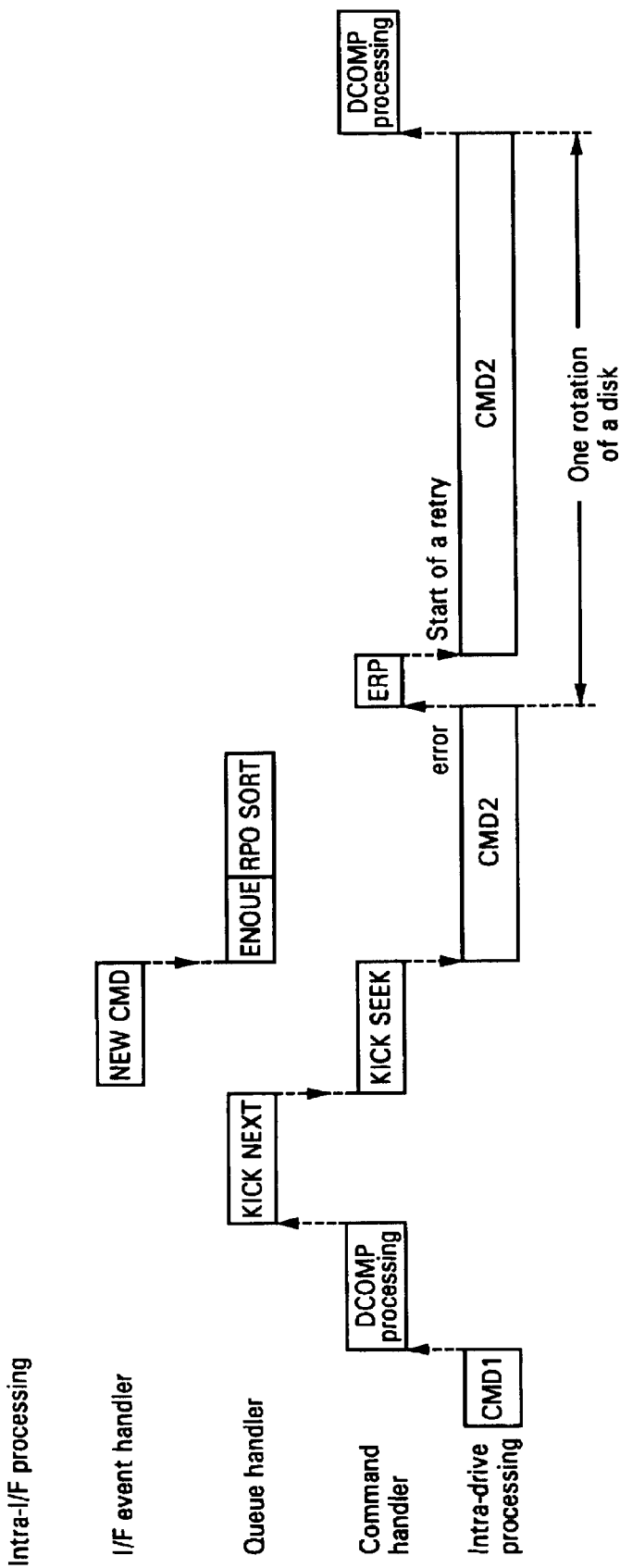
FIG. 14 is a timeline for conventional command processing.

FIGS. 12A and 12B are diagrams explaining the difference between the intra-drive processing of Embodiment 2 of the present invention when long seek times arise and conventional intra-drive processing. FIG. 12A shows the intra-drive processing according to Embodiment 2 of the present invention, and FIG. 12B shows conventional intra-drive processing.

In the conventional intra-drive processing shown in FIG. 12B, a command handler requests a seek of a track that is an access target of drive means (Seek Req). Then, the seek is started and is continued even if the seek time becomes the long seek time. When the seek is completed (the positioning of an access mechanism is completed) (Seek Comp), a drive event handler generates a drive event announcing the completion of the seek, and this drive event is sent to the command handler (Seek Comp report).

In RPO, the seek time and latency time of each execution-waiting command is estimated, and an execution-waiting command having the shortest seek/latency time (=seek time+latency time) is selected as a command to be next executed. For this reason, if the seek in the intra-drive processing is completed within the seek time estimated with RPO, the target sector arrives under a read head in the access mechanism not later than the estimated latency time after the completion of positioning of the access mechanism (completion of seek). In such a case, it is possible to start an access to the target sector within the seek/latency time, estimated with RPO, from the start of a seek (start of command execution).

The long seek time arises, however, if the target sector has already passed through under the read/write head by the time the positioning of the access mechanism is completed. Therefore, in conventional intra-drive processing, it is necessary to wait one disk rotation so as to start an access to the target sector after the completion of positioning of the access mechanism.

On the other hand, with the intra-drive processing according to Embodiment 2 that is shown in FIG. 12A, the seek starts when the command handler 22 (see FIG. 3) requests a seek of a track (access target) of the HDC 4 (see FIGS. 1 and 3) (Seek Req). After that, if seek time in intra-drive processing exceeds seek time estimated with RPO, the drive event handler 24 judges that a seek timeout error arises (timeout), and generates a drive event announcing the incidence of the seek timeout error to send this drive event to the command handler 22 (Error report).

When recognizing the drive event announcing the seek timeout error, the command handler 22 performs the error processing shown in FIG. 6, and restores the command that is being executed (and that generated the seek timeout error) to the command queue. The queue handler 21 re-sorts the execution-waiting commands (including the command restored) in the command queue with RPO, and sends a command, selected by re-sorting, to the command handler 22 to request the execution of the selected command. The command handler 22 starts the execution of the command sent from the queue handler 21 according to the procedure shown in FIG. 5.

In this intra-drive processing according to Embodiment 2, a disk apparatus judges that an error arises if the seek time in the intra-drive processing exceeds the seek time estimated with RPO, restores the command being executed to the command queue, re-sorts commands with RPO, and executes a command selected by re-sorting. For this reason, in case the target sector has already passed through under the read/write head 13 due to long seek time when the positioning of the access mechanism 2 is completed, it is judged before the completion of the seek that an error arises, and the execution of the selected command by the re-sorting is started without waiting one rotation of the disk 1.

Owing to this, the rotational latency time like that in conventional intra-drive processing never arises even if the long seek time arises.

In this manner, according to Embodiment 2, a disk apparatus judges that an error arises if the seek time in the processing relating to a disk access exceeds the seek time estimated with RPO, restores the command being executed to the command queue, and executes a selected command by re-sorting with RPO. Owing to this, it is possible to increase the efficiency of the command processing by reducing the rotational latency time of a disk due to the dispersion of seek times.

As described above, the present invention has such an effect that it is possible to increase the efficiency of command processing by reducing the rotational latency time of a disk at the time of command execution through restoring a command being executed to a command queue if an error relating to a disk access arises during the execution of the command and selecting a command to be next executed from among a plurality of execution-waiting commands in the command queue.

In addition, by estimating the seek time of a command to be executed, judging that an error relating to a disk access arises if the seek time of the command executed exceeds the seek time estimated, and further, for example, restoring the command that is being executed to the command queue if the error relating to a disk access arises, the present invention has such an effect that it is possible to increase the efficiency of command processing by reducing the rotational latency time of a disk due to the dispersion of seek times.

While the invention has been particularly shown and described with reference to a preferred embodiment, it will be understood by those skilled in the art that various changes in form and detail may be made therein without departing from the spirit and scope of the invention.

What is claimed is:

1. A disk apparatus, comprising:
   interface means for receiving commands from an external apparatus and transferring data to and from said external apparatus;
   command storage means for storing one or more of said received commands;
   data storage means for holding data; and
   control means for selecting a command to be next executed from among said one or more commands, for dispatching said selected command for execution, for determine whether an error relating to accessing said data storage means has arisen during execution of said selected command, for discontinuing execution of said selected command upon a determination that said error has arisen, and for re-storing said selected command in said command storage means in response to said determination that said error has arise, wherein after said selected command has been restored to said command storage means, said control means selects a subsequent command to be next executed from among said one or more commands in said command storage means; and said control means thereafter dispatches said selected subsequent command for execution before retrying an execution of said restored selected command.

2. A disk apparatus according to claim 1, wherein said control means comprises:
   drive means for driving an access mechanism to access said data storage means;
   drive monitor means for determining whether said error has arisen; and
   command execution means for controlling said drive means and interface means in accordance with said selected command and for restoring said selected command to said command storage means in response to a determination that said error has arisen.

3. A disk apparatus according to claim 1, wherein said command storage means comprises a command queue.

4. A disk apparatus according to claim 1, wherein:
   said control means determines an estimated seek time for said selected command, seek time being an amount of time from starting execution of said selected command to positioning an access mechanism over a target track on said data storage means; and
   when said selected command is executed, said control means judges that said error has arisen if actual seek time of said selected command exceeds said estimated seek time.

5. A disk apparatus according to claim 1, wherein:
   said control means estimates seek/latency time of each of said one or more commands in said command storage means, seek/latency time being an amount of time from starting execution of said s elected command to positioning an access mechanism over a target sector on said data storage means; and
   said control means selects said selected command from among said one or more commands in said command storage means based on said estimated seek/latency time or times of said one or more commands.

6. A method for controlling a disk apparatus having an interface, command storage, and data storage, said method comprising:
   receiving one or more commands from an external apparatus via said interface;
   storing said one or more commands in said command storage;
   selecting a command to be next executed from among said one or more commands;
   dispatching said selected command for execution;
   determining whether an error relating to accessing said data storage has arisen during execution of said selected command;
   upon determining that said error has occurred, discontinuing execution of said selected command; and
   re-storing said selected command in said command storage in response to said determination that said error has arisen;
   after said selected command has been restored to said command storage, selecting a subsequent command to be next executed from among said one or more commands in said command storage; and
   thereafter dispatching said selected subsequent command for execution before retrying an execution of said restored selected command.

7. The method of claim 6, wherein said step of dispatching for execution said selected command comprises:
   driving an access mechanism of said disk apparatus in accordance with said selected command; and
   determining that an error relating to disk access has arisen; and
   restoring said selected command to said command storage means in response to determining that said error has arisen.

8. The method of claim 6, wherein said step of holding said one or more commands in said command storage comprises storing said one or more commands in a command queue.

9. The method of claim 7, wherein:
   said method further comprises determining an estimated seek time for said selected command, seek time being an amount of time from starting execution of said selected command to positioning an access mechanism over a target track on said data storage means; and
   said step of determining whether said error has arisen comprises judging that said error has arisen if actual seek time of said selected command exceeds said estimated seek time.

10. The method of claim 6, wherein:
    said method further comprises estimating a seek/latency time for each of said one or more commands in said command storage means, seek/latency time being an amount of time from starting execution of said selected command to positioning an access mechanism over a target sector on said data storage means; and
    said step of selecting a command to be next executed from among said one or more commands comprises selecting said selected command from among said one or more commands in said command storage based on said estimated seek/latency time or times of said one or more commands.

11. A program product, stored on a computer-usable medium, for controlling a disk apparatus having an interface, command storage, and data storage, said program product comprising:
    computer program code for selecting a command to be next executed from among one or more commands in said command storage;

computer program code for dispatching said selected command for execution;

computer program code for discontinuing execution of and restoring said selected command to said command storage in response to a determination that an error relating to accessing said data storage has arisen during execution of said selected command; and computer program code for, after said selected command has been restored to said command storage, selecting a subsequent command to be next executed from among said one or more commands in said command storage, and thereafter dispatching said selected subsequent command for execution before retrying an execution of said restored selected command.

12. A program product according to claim 11, wherein:

said computer program code determines an estimated seek time for said selected command, seek time being an amount of time from starting execution of said selected command to positioning an access mechanism over a target track on said data storage; and when said selected command is executed, said control logic judges that s aid error has arisen if actual seek time of said selected command exceeds said estimated seek time.

13. A program product according to claim 11, wherein:

said computer program code estimates seek/latency time of each of said one or more commands in said command storage, seek/latency time being an amount of time from starting execution of said selected command to positioning an access mechanism over a target sector on said data storage; and said computer program code selects said selected command from among said one or more commands in said command storage means based on said estimated seek/latency time or times of said one or more commands.

* * * * *

UNITED STATES PATENT AND TRADEMARK OFFICE
CERTIFICATE OF CORRECTION

PATENT NO. : 6,721,906 B1
DATED : April 13, 2004
INVENTOR(S) : Hirashita et al.

It is certified that error appears in the above-identified patent and that said Letters Patent is hereby corrected as shown below:

Column 12,
Line 65, please add -- Its unit is %. -- after "arising".
Line 66, please delete "Its unit is %."

Column 15,
Line 17, please change "determine" to -- detemining --.
Line 23, please change "arise" to -- arisen --.
Line 58, please change "s elected" to -- selected --.

Column 16,
Line 37, please change "claim 7" to -- claim 6 --.

Column 18,
Line 4, please change "s aid" to -- said --.

Signed and Sealed this

Twenty-second Day of March, 2005

JON W. DUDAS
*Director of the United States Patent and Trademark Office*